United States Patent Office
3,067,097
Patented Dec. 4, 1962

3,067,097
ANTI-TURKEY BLACKHEAD COMPOSITIONS OF 1-ETHYL-3-METHYL-3(5-NITRO-2-THIAZOLYL) UREA AND METHOD OF USING SAME
Alexander R. Matzuk, Colonia, Horace D. Brown, Plainfield, and Lewis H. Sarett, Princeton, N.J., assignors to Merck & Co., Inc., Rahway, N.J., a corporation of New Jersey
No Drawing. Filed Mar. 9, 1961, Ser. No. 94,434
4 Claims. (Cl. 167—53.1)

This application is a continuation-in-part of our pending application, Serial No. 849,716 filed October 30, 1959, now abandoned.

This invention relates to 1-ethyl-3-methyl-3-(5-nitro-2-thiazolyl) urea and to a method of preparing the same. It is also concerned with the application of the above compound in the veterinary field, especially against harmful protozoal and histomonal infections to which fowl are susceptible, particularly *Histomonas meleagridis*.

According to the present invention, it has been found that the compound 1-ethyl-3-methyl-3-(5-nitro-2-thiazolyl) urea has useful medicament properties and is particularly useful in the control and prevention of enterohepatitis, common called blackhead disease, which infects turkeys.

This compound may be convenient produced by reacting 1-ethyl-3-(5-nitro-2-thiazolyl) urea with a methylating agent, such as, for example, methyl iodide or dimethyl sulfate in the presence of a strong base. Other methyl halides such as methyl bromide, methyl chloride and the like may also be used. However, the preferred methylating agent is methyl iodide. Strong bases such as potassium hydroxide, sodium hydroxide or the equivalent may be employed in carrying out the above reaction.

In accordance with this procedure 1-ethyl-3-(5-nitro-2-thiazolyl) urea is suspended in acetone and potassium hydroxide is added at room temperature. In addition to acetone other solvents which are capable of solubilizing the desired product as formed during the reaction may be employed. Illustrative of such solvents are methyl ethyl ketone, dioxane, tetrahydrofuran, dimethyl sulfoxide and dimethyl acetamide. The mixture is then reacted with a methylating agent such as methyl iodide or dimethyl sulfate to form 1-ethyl-3-methyl-3-(5-nitro-2-thiazolyl) urea. The ratio of reactants employed is not critical but for practical reasons substantially equal molar quantities of reactants are employed although an excess of base and methylating agent may be used if desired. The reaction proceeds at ordinary room temperature but if desired elevated temperatures such as the reflux temperature of the reaction mixture may be used. The reaction goes to completion in from about ½ hour to 12 hours or more according to the reaction temperature, concentration of reactants and particular methylating agent employed. The desired solid reaction product is then readily obtained on evaporation of the reaction mixture.

The 1-ethyl-3-(5-nitro-2-thiazolyl) urea used as the starting material in the above process may be prepared in accordance with the process described in Example 2 of U.S. Patent No. 2,755,285 to O'Neill et al., issued July 17, 1956.

As previously stated, the compound of this invention has important anti-protozoal activity and is particularly valuable in the veterinary field. Thus, when administered in concentrations of about 0.015 to 0.3%, and preferably 0.02 to 0.1%, in the diet, the compound is effective in the treatment and prevention of blackhead in turkeys.

The following examples are intended to be illustrative only and may be varied or modified without departing from the spirit and scope of this invention.

EXAMPLE 1

100 g. (0.46 mole) of 1-ethyl-3-(5-nitro-2-thiazolyl) urea was suspended in 1 liter of acetone. Then 30.3 g. (0.46 mole) of potassium hydroxide (85% purity) was rapidly added to the stirred slurry at room temperature. To the resulting suspension was added 65.3 g. (0.46 mole) of methyl iodide with continuous stirring. The solution which formed was allowed to stand overnight at room temperature. Charcoal was then added and the solution filtered to remove any impurities. The resulting clear acetone filtrate was allowed to evaporate for approximately 16 hours at room temperature. The solid 1-ethyl-3-methyl-3-(5-nitro-2-thiazolyl) urea that remained was triturated well with water, then with 2.5 N sodium hydroxide and again with water. The volumes of washes are not critical due to the sparing solubility of the product in water and dilute sodium hydroxide at room temperature. The product was then recrystallized from a 1:1 mixture of acetone and water. 15.8 g. of the crude 1-ethyl-3-methyl-3-(5-nitro-2-thiazolyl) urea thus obtained was dissolved in 25 ml. of warm dimethyl formamide and the resulting solution diluted with a large excess of benzene. The solution was passed through a column containing 1,000 g. of alumina which was previously washed with acetone and petroleum benzin. The column was then washed with a large volume of petroleum benzin and eluted with 10 l. of a 1:1 mixture of ether and acetone. The eluate was evaporated to dryness and the residue that remained was recrystallized from ethanol. The 1-ethyl-3-methyl-3-(5-nitro-2-thiazolyl) urea thus obtained had a melting point of 186–188° C.

EXAMPLE 2

10.4 g. (0.048 mole) of 1-ethyl-3-(5-nitro-2-thiazolyl) urea was suspended in 500 ml. acetone. Then 3.6 g. (0.054 mole) of potassium hydroxide (85% purity) was rapidly added to the stirred slurry at room temperature. To the resulting suspension was added 6.8 g. (0.054 mole) of dimethyl sulfate with continuous stirring. The resulting solution was allowed to stand overnight at room temperature. Charcoal was then added and the solution filtered. The residue obtained on evaporation of the acetone filtrate was washed with water, then with 2.5 N sodium hydroxide and again with water and then dried to constant weight. The dry 1-ethyl-3-methyl-3-(5-nitro-2-thiazolyl) urea thus obtained showed no depression in melting point on admixture with a sample prepared as described in Example 1.

EXAMPLE 3

Day-old straight run Beltsville white turkey poults were reared in electrically heated battery-brooders and fed an open formula of commercial turkey starter ration and water ad lib. Enterohepatitis was induced with cecal worm infections by orally inoculating the poults (at two weeks of age) with *Heterakis gallinae* ova. Three days after infection, the birds were fed a medicated ration containing graded concentrations of 1-ethyl-3-methyl-3-(5-nitro-2-thiazolyl) urea. Feeding of the medicated ration was continued for 18 days and the surviving turkeys were then sacrificed and examined for pathological lesions characteristic of infectious enterohepatitis. The presence and severity of the lesions were scored as follows: 0=normal, 1=minimal detectable and 4=maximal. Other criteria used for assessing the extent of disease in the untreated controls and in the treated turkeys were the mortality rate and relative growth rates.

The results of experiments in which infected turkeys were fed various concentrations of 1-ethyl-3-methyl-3-(5-nitro-2-thiazolyl) urea are set forth in the following table:

*Table I*

| Percent In Feed | Mean Wt. (Gms.) | | Mortality, No./Total | Percent | Mean Lesion Score | |
|---|---|---|---|---|---|---|
| | Initial | Terminal | | | Ceca | Liver |
| 0.0125 | 299 | 554 | 0/5 | 0 | 2.4 | 1.2 |
| 0.05 | 315 | 603 | 0/5 | 0 | 0.0 | 0.0 |
| Infected controls | 294 | 427 | 13/15 | 18 | 3.2 | 3.2 |
| Uninfected controls | 296 | 561 | 0/5 | 0 | | |

EXAMPLE 4

The advantages of 1-ethyl-3-methyl-3-(5-nitro-2-thiazolyl) urea over 1-ethyl-3-(5-nitro-2-thiazolyl) urea are set forth in Table II, below. Both compounds were administered at a level of 0.0125% by weight in the feed. The data for Table II were obtained by means of experiments which were conducted using a procedure similar to that given in Example 3.

*Table II*

| Compound | Mean Wt. (Gms.) | | Mortality, No./Total | Percent | Ceca | Liver |
|---|---|---|---|---|---|---|
| | Initial | Terminal | | | | |
| 1-ethyl-3-methyl-3-(5-nitro-2-thiazolyl) urea | 299 | 554 | 0/5 | 0 | 2.4 | 1.2 |
| 1-ethyl-3-(5-nitro-2-thiazolyl) urea | 173 | 375 | 2/5 | 40 | 3.0 | 3.2 |

Any departure from the above description which conforms to the present invention is intended to be included within the scope of the claims.

What is claimed is:

1. A composition for treatment and prevention of turkey blackhead that comprises turkey feed containing from about 0.010% to about 0.30% by weight of 1-ethyl-3-methyl-3-(5-nitro-2-thiazolyl) urea.

2. A composition for treatment and prevention of turkey blackhead that comprises an element of turkey sustenance containing from about 0.02% to about 0.1% by weight of 1-ethyl-3-methyl-3-(5-nitro-2-thiazolyl) urea.

3. The method of combatting turkey blackhead that comprises orally administering an effective, non-toxic dose of 1-ethyl-3-methyl-3-(5-nitro-2-thiazolyl) urea to turkeys susceptible to turkey blackhead infection.

4. The method of combatting turkey blackhead that comprises orally administering to turkeys susceptible to turkey blackhead an element of turkey sustenance containing from about 0.010% to about 0.30% by weight of 1-ethyl-3-methyl-3-(5-nitro-2-thiazolyl) urea.

References Cited in the file of this patent

UNITED STATES PATENTS 2,755,285   O'Neill _____ July 17, 1956